United States Patent
Okada et al.

(10) Patent No.: US 10,704,920 B2
(45) Date of Patent: *Jul. 7, 2020

(54) TRAFFIC LANE GUIDANCE SYSTEM FOR VEHICLE AND TRAFFIC LANE GUIDANCE METHOD FOR VEHICLE

(71) Applicant: TOYOTA JIDOSHA KABUSHIKI KAISHA, Aichi-ken (JP)

(72) Inventors: Hiroki Okada, Musashino (JP); Ryo Neyama, Nerima-ku (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/269,749

(22) Filed: Feb. 7, 2019

(65) Prior Publication Data

US 2019/0170534 A1 Jun. 6, 2019

Related U.S. Application Data

(63) Continuation of application No. 15/812,084, filed on Nov. 14, 2017, now Pat. No. 10,240,941, which is a
(Continued)

(30) Foreign Application Priority Data

Oct. 9, 2013 (JP) .................. 2013-211867

(51) Int. Cl.
*G01C 21/36* (2006.01)
*B62D 15/02* (2006.01)
*G01C 21/34* (2006.01)

(52) U.S. Cl.
CPC ....... *G01C 21/3658* (2013.01); *B62D 15/021* (2013.01); *G01C 21/3446* (2013.01)

(58) Field of Classification Search
CPC ............ G01C 21/3658; G01C 21/3446; B62D 15/021
(Continued)

(56) References Cited

U.S. PATENT DOCUMENTS 6,853,906 B1 * 2/2005 Michi ................ B60K 31/0008
701/410
7,742,853 B2 6/2010 Mori et al.
(Continued)

FOREIGN PATENT DOCUMENTS

JP 2007-192584 A 8/2007
JP 2011-038794 A 2/2011
(Continued)

*Primary Examiner* — Marthe Y Marc-Coleman
(74) *Attorney, Agent, or Firm* — Sughrue Mion, PLLC

(57) ABSTRACT

A lane guidance system for a vehicle for guiding a vehicle to a recommended lane in which the vehicle is recommended to run out of traffic lanes included in a route from a first point to a second point through the use of an output unit mounted on the vehicle includes: a calculating unit that calculates a predicted value of an occurrence probability of sudden lane change as information indicating the occurrence probability of sudden lane change when the vehicle runs in sections corresponding to a plurality of links; a setting unit that sets the recommended lane on the basis of the predicted value; and a generating unit that generates guidance information for the recommended lane and that outputs the guidance information to the output unit.

11 Claims, 7 Drawing Sheets

Related U.S. Application Data continuation of application No. 15/028,196, filed as application No. PCT/IB2014/002282 on Oct. 8, 2014, now Pat. No. 9,851,216.

(58) Field of Classification Search
USPC .......................................................... 701/437
See application file for complete search history.

(56) References Cited

U.S. PATENT DOCUMENTS

| | | |
|---|---|---|
| 9,851,216 B2 | 12/2017 | Okada et al. |
| 10,240,941 B2 | 3/2019 | Okada et al. |
| 2001/0027377 A1 | 10/2001 | Shimabara |
| 2005/0015203 A1 | 1/2005 | Nishira |

FOREIGN PATENT DOCUMENTS

| | | | |
|---|---|---|---|
| JP | 2011-226962 A | 11/2011 |
| JP | 2012-221353 A | 11/2012 |
| WO | 2012/089281 A1 | 7/2012 |

* cited by examiner

TRAFFIC LANE GUIDANCE SYSTEM FOR VEHICLE AND TRAFFIC LANE GUIDANCE METHOD FOR VEHICLE

CROSS-REFERENCE TO RELATED APPLICATIONS

This is a continuation of U.S. patent application Ser. No. 15/812,084 filed Nov. 14, 2017 (allowed), which is a continuation of U.S. patent application Ser. No. 15/028,196, filed Apr. 8, 2016 (now U.S. Pat. No. 9,851,216 issued Dec. 26, 2017), which is a National Stage entry of International Application No. PCT/IB2014/002282, filed Oct. 8, 2014, which claims priority to Japanese Application No. 2013-211867, filed Oct. 9, 2013. The entire disclosures of the prior applications are considered part of the disclosure of the accompanying continuation application, and are hereby incorporated by reference.

BACKGROUND OF THE INVENTION

1. Field of the Invention

The present invention relates to a traffic lane guidance system for a vehicle and a traffic lane guidance method for a vehicle for guiding a vehicle to a traffic lane so as to suppress the occurrence of sudden lane change of a vehicle.

2. Description of Related Art

In a navigation system mounted on a vehicle, guidance of a route from a current point as a first point and a destination point as a second point is carried out using voice, images, or the like. A navigation system for guiding an optical traffic lane for a running vehicle has been developed.

For example, in a driving support system described in Japanese Patent Application Publication No. 2012-221353 (JP 2012-221353 A), the occurrence probability of sudden lane change when a vehicle enters a point of intersection from traffic lanes is calculated as statistical information of right turns and left turns. By guiding a vehicle to a traffic lane in which the vehicle has to run in the vicinity of the intersection on the basis of the calculated statistical information, the occurrence of sudden lane change when the vehicle enters the point of intersection is suppressed.

However, in the driving support system described in JP 2012-221353 A, the lane change frequency occurring while a vehicle runs from a point of intersection to a subsequent point of intersection is not considered at all. Accordingly, when the lane change frequency of a vehicle increases in a route portion other than the points of intersection in the entire route from a current point to a destination point by guiding the vehicle to a traffic lane in which the vehicle has to run in the vicinity of the points of intersection, the occurrence of sudden lane change of the vehicle in the route portion may be rather promoted. That is, in the driving support system, an optical traffic lane in the vicinity of a point of intersection is guided on the basis of local information for each point of intersection so as to suppress the occurrence of sudden lane change when the vehicle enters the point of intersection. Accordingly, when the entire route from the current point to the destination point is considered, it cannot be said that the guided traffic lane is necessarily an optimal traffic lane for suppressing the occurrence of sudden lane change of a vehicle.

SUMMARY OF THE INVENTION

The invention provides a traffic lane guidance system for a vehicle and a traffic lane guidance method for a vehicle that can guide a vehicle to a traffic lane and that can suppress the occurrence of sudden lane change in consideration of the entire route from a first point to a second point.

According to a first aspect of the invention, there is provided a traffic lane guidance system for a vehicle for guiding a vehicle to a recommended lane in which the vehicle is recommended to run out of traffic lanes included in a route from a first point to a second point through the use of a guidance information output unit mounted on the vehicle. The traffic lane guidance system for a vehicle includes: a predicted value calculating unit that calculates a predicted value of an occurrence probability of sudden lane change as information indicating the occurrence probability of sudden lane change when the vehicle runs in sections corresponding to a plurality of links, which are set by connecting a plurality of nodes corresponding to traffic lanes in a traveling direction of the vehicle and a direction intersecting the traveling direction of the vehicle, for each of the plurality of links on the basis of statistical information acquired from a plurality of vehicles and an information quantity of the statistical information; a recommended lane setting unit that sets the recommended lane on the basis of the predicted value calculated by the predicted value calculating unit; and a guidance information generating unit that generates guidance information for the recommended lane set by the recommended lane setting unit and that outputs the generated guidance information to the guidance information output unit.

According to a second aspect of the invention, there is provided a traffic lane guidance method for a vehicle of guiding a vehicle to a recommended lane in which the vehicle is recommended to run out of traffic lanes included in a route from a first point to a second point through the use of a guidance information output unit mounted on the vehicle. The traffic lane guidance system for a vehicle including: calculating a predicted value of an occurrence probability of sudden lane change as information indicating the occurrence probability of sudden lane change when the vehicle runs in sections corresponding to a plurality of links, which are set by connecting a plurality of nodes corresponding to traffic lanes in a traveling direction of the vehicle and a direction intersecting the traveling direction of the vehicle, for each of the plurality of links on the basis of statistical information acquired from a plurality of vehicles and an information quantity of the statistical information; setting the recommended lane on the basis of the calculated predicted value of the occurrence probability of sudden lane change; and generating guidance information for the set recommended lane and that outputs the generated guidance information to the guidance information output unit.

According to these configurations, the predicted value calculating unit calculates the predicted value of the occurrence probability of sudden lane change when the vehicle runs in the route from the first point to the second point for each section corresponding to the links. The recommended lane setting unit extracts the route in which the sudden lane change of the vehicle does not occur well from the route from the first point to the second point on the basis of the calculated predicted values and sets the traffic lane included in the extracted route as the recommended lane. That is, the recommended lane is set to a traffic lane in which the occurrence of the sudden lane change of the vehicle can be suppressed in consideration of the entire route from the first point to the second point. Accordingly, by causing the guidance information generating unit to generate guidance information for the set recommended lane and to output the generated guidance information to the guidance information output unit, it is possible to guide the vehicle to a traffic lane more suitable for suppressing the occurrence of the sudden lane change of the vehicle.

In the aspect, the recommended lane setting unit may set the traffic lane included in the route in which the total sum of the predicted values of the occurrence probability of sudden lane change is minimized in the route from the first point to the second point.

According to this configuration, the traffic lane included in the route in which the sudden lane change of the vehicle occurs less in consideration of the entire route from the first point to the second point is set as the recommended lane.

In the aspect, the recommended lane setting unit may set the traffic lane included in the route in which the total sum of the predicted values of the occurrence probability of sudden lane change is minimized under the condition not including the link in which the predicted value is greater than a predetermined threshold value in the route from the first point to the second point as the recommended lane.

According to this configuration, the route locally including a section in which the sudden lane change of the vehicle often occurs in the route from the first point to the second point is excluded from appropriate route candidates. That is, since the recommended lane does not locally include a section in which the sudden lane change of the vehicle often occurs, it is possible to guide the vehicle to a traffic lane more suitable for suppressing the occurrence of the sudden lane change of the vehicle.

In the aspect, the recommended lane setting unit may determine the traffic lane included in the route in which the total sum of the predicted values of the occurrence probability of sudden lane change is minimized by applying a Dijkstra's algorithm to the predicted value of the occurrence probability of sudden lane change calculated for each link included in the route from the first point to the second point.

According to this configuration, it is possible to easily implement a configuration for determining the route in which the total sum of the predicted values of the occurrence probability of sudden lane change is minimized in the route from the first point to the second point.

In the aspect, the recommended lane setting unit may set the traffic lane included in the route in which the number of links set by connecting the plurality of nodes in the direction intersecting the traveling direction of the vehicle is minimized under the condition not including the link in which the predicted value is greater than a predetermined threshold value in the route from the first point to the second point as the recommended lane.

According to this configuration, on the premise that the route does not locally include a section in which the sudden lane change of the vehicle often occurs, a traffic lane included in the route in which the lane change frequency is minimized in the route from the first point to the second point is set as the recommended lane. That is, since the recommended lane does not locally include a section in which the sudden lane change of the vehicle often occurs and the lane change frequency is minimized, it is possible to guide the vehicle to a traffic lane even more suitable for suppressing the occurrence of the sudden lane change of the vehicle.

In the aspect, the predicted value calculating unit may set an addition value, which is added to the predicted values of the occurrence probability of sudden lane change in the links set by connecting the plurality of nodes in the direction intersecting the traveling direction of the vehicle, to be greater than an addition value added to the predicted values in the links set by connecting the plurality of nodes in the traveling direction of the vehicle, and the recommended lane setting unit may set the recommended lane on the basis of the predicted values of the occurrence probability of sudden lane change to which the addition value is added.

In general, when a vehicle changes a traffic lane, a driver's burden when the sudden lane change of the vehicle occurs is greater than that when the vehicle runs straightly in a lane. Accordingly, in the above-mentioned configuration, the weighting value of the addition value for the predicted value of the occurrence probability of sudden lane change in a link corresponding to the section in which the vehicle runs at the time of changing the traffic lane is set to be greater than that for the predicted value in a link corresponding to a section in which the vehicle runs straightly in a lane. That is, the weighting value is set for the predicted values of the occurrence probability of sudden lane change depending on situations in consideration of the variation of the driver's burden when the sudden lane change occurs depending on whether to change the lane. Accordingly, it is possible to guide the vehicle to a traffic lane more suitable for suppressing the occurrence of the sudden lane change of the vehicle depending on the situations.

In the aspect, the predicted value calculating unit may be able to set a weighting value for the addition value and may gradually increase the weighting value set for the addition value as the distance from a point, at which the steering operation frequency of the vehicle is greater than a predetermined threshold value, decreases in the route from the first point to the second point.

In general, when a vehicle runs in the vicinity of a point at which a steering operation is frequently required such as a point of intersection, the driver's burden when the sudden lane change occurs at the time of changing the traffic lane is greater than that when the vehicle runs at other points. Accordingly, in the above-mentioned configuration, as the running position of the vehicle becomes closer to the point, the weighting value for the predicted value of the occurrence probability of sudden lane change in the link corresponding to the section in which the vehicle runs at the time of changing the traffic lane is set to be greater. That is, the weighting value for the predicted value of the occurrence probability of sudden lane change is changed depending on the situations in consideration of the variation of the driver's burden when sudden lane change occurs due to the variation in the distance from the point. Accordingly, it is possible to guide the vehicle to a traffic lane more suitable for suppressing the occurrence of the sudden lane change of the vehicle at a point of intersection or the like depending on the situation.

In the aspect, the predicted value calculating unit may determine a second addition value which is different from a first addition value as the addition value to be added to the predicted values of the occurrence probability of sudden lane change when the addition value is the first addition value and may set the second addition value, when the appropriateness of personal driving characteristics for sections corresponding to the links is relatively high, to be smaller than that when the appropriateness is relatively low, and the recommended lane setting unit may set the recommended lane on the basis of the predicted values of the occurrence probability of sudden lane change to which the first addition value and the second addition value are added.

In general, when the appropriateness of personal driving characteristics for a section corresponding to a link is relatively high, the driver's burden at the time of changing the traffic lane when the vehicle runs in the section is smaller than that when the appropriateness is relatively low. Accordingly, in the above-mentioned configuration, the weighting value for the predicted value of the occurrence probability of sudden lane change is changed depending on the situations in consideration of the variation of the driver's burden when the sudden lane change occurs due to the appropriateness of the personal driving characteristics for the section corresponding to the link. Accordingly, it is possible to guide the vehicle to a traffic lane more suitable for suppressing the occurrence of the sudden lane change of the vehicle depending on personal driving characteristics.

In the aspect, the predicted value calculating unit may classify information acquired from the plurality of vehicles as information of elements of personal driving characteristics into a plurality of driving characteristic information groups, may classify information of elements of lane characteristics into a plurality of lane characteristic information groups, and may set the second addition value to be added to the predicted values of the occurrence probability of sudden lane change, when the appropriateness of the driving characteristic information groups and the lane characteristic information groups is relatively high, to be smaller than that when the appropriateness is relatively low.

According to this configuration, the information of the elements of personal driving characteristics and the information of the elements of the traffic lane characteristics are statistically processed and classified and the weighting value for the predicted value of the occurrence probability of sudden lane change is changed depending on the appropriateness of the classified information groups. Accordingly, it is possible to implement the configuration for changing the weighting value for the predicted value of the occurrence probability of sudden lane change depending on the situation in consideration of the variation of the driver's burden when the sudden lane change occurs due to the appropriateness of the personal driving characteristics for the section corresponding to the link.

In the aspect, the predicted value calculating unit may determine a third addition value which is different from the first addition value and the second addition value as the addition value to be added to the predicted values of the occurrence probability of sudden lane change and may set the third addition value, when the appropriateness of vehicle characteristics for sections corresponding to the links is relatively high, to be smaller than that when the appropriateness is relatively low, and the recommended lane setting unit may set the recommended lane on the basis of the predicted values of the occurrence probability of sudden lane change to which the first addition value, the second addition value, and the third addition value are added.

In general, when the appropriateness of the vehicle characteristics for a section corresponding to a link is relatively high, the driver's burden when the sudden lane change of the vehicle occurs at the time of running in the section is smaller than that when the appropriateness is relatively low. Accordingly, in the above-mentioned configuration, the weighting value for the predicted value of the occurrence probability of sudden lane change changes depending on the situations in consideration of the variation of the driver's burden when the sudden lane change occurs due to the appropriateness of the vehicle characteristics for the section corresponding to the link. Accordingly, it is possible to guide the vehicle to a traffic lane more suitable for suppressing the occurrence of the sudden lane change of the vehicle depending on the situation.

In the aspect, the positions of the nodes may include a plurality of positions spaced in the traveling direction of the vehicle in the traffic lanes of the route portion between neighboring points of intersection in the route from the first point to the second point.

According to this configuration, since more nodes than the nodes when the nodes are set at only the positions corresponding to the points of intersection on the route are set on the route, it is possible to better guide the vehicle to a traffic lane more suitable for suppressing the occurrence of the sudden lane change of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a first embodiment of a traffic lane guidance system for a vehicle and a traffic lane guidance method for a vehicle will be described with reference to the accompanying drawings.

Figure 1:
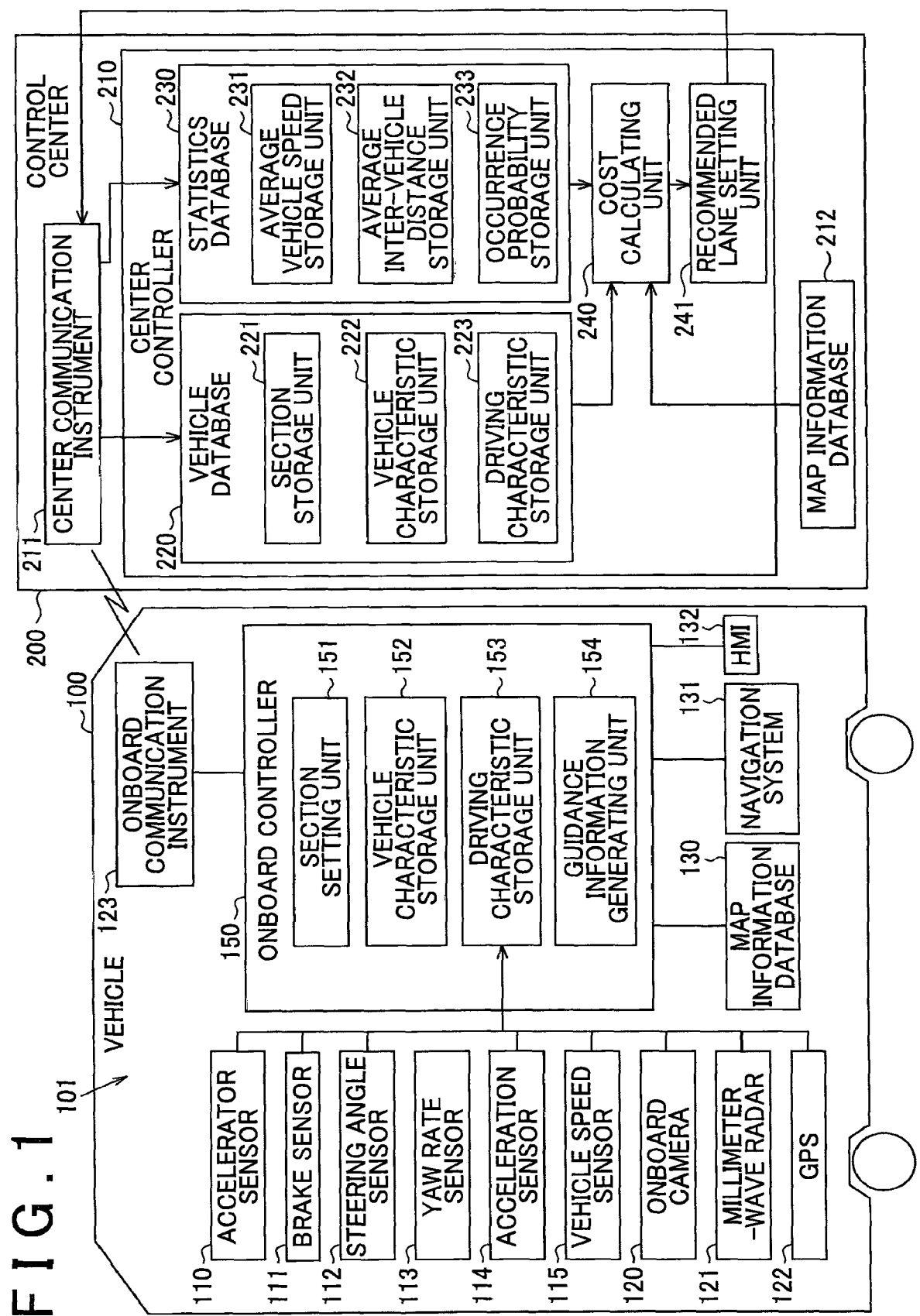
FIG. 1 is a block diagram of a traffic lane guidance system for a vehicle according to a first embodiment of the invention.

As illustrated in FIG. 1, the traffic lane guidance system for a vehicle according to this embodiment includes an onboard system 101 mounted on a vehicle 100 and a control center 200 constituting a probe information communication system. The control center 200 collects and manages vehicle information (probe information) of the vehicle 100 that runs on a road.

The onboard system 101 includes an accelerator sensor 110, a brake sensor 111, a steering angle sensor 112, a yaw rate sensor 113, an acceleration sensor 114, and a vehicle speed sensor 115 as elements for acquiring information on the state of the vehicle 100. These elements are electrically connected to an onboard controller 150.

The accelerator sensor 110 detects an accelerator pressure varying with a driver's operation of an accelerator pedal and outputs a signal corresponding to the detected accelerator pressure to the onboard controller 150. The brake sensor 111 detects a driver's operation of a brake pedal and outputs a signal corresponding to the detected operation to the onboard controller 150. The steering angle sensor 112 detects a steering angle of a steering wheel on the basis of a variation in the steering angle of the steering wheel and outputs a signal corresponding to the detected steering angle to the onboard controller 150. The yaw rate sensor 113 detects a yaw rate that is a variation rate of a rotation angle in the turning direction of the vehicle 100 and outputs a signal corresponding to the detected yaw rate to the onboard controller 150. The acceleration sensor 114 detects the acceleration of the vehicle and outputs a signal corresponding to the detected acceleration to the onboard controller 150. The vehicle speed sensor 115 detects a vehicle speed that is the speed of the vehicle and outputs a signal corresponding to the detected vehicle speed to the onboard controller 150.

The onboard system 101 includes an onboard camera 120, a millimeter-wave radar 121, a global positioning system (GPS) 122, and an onboard communication instrument 123 as elements for acquiring information on circumstances around the vehicle. These elements are electrically connected to the onboard controller 150.

The onboard camera 120 takes an image of a predetermined range in front of the vehicle 100 using an optical CCD (Charge-Coupled Device) camera installed in the back of a room mirror or the like. The onboard camera 120 outputs an image signal based on the captured image to the onboard controller 150.

The millimeter-wave radar 121 has a distance measuring function of measuring a distance between an object present around the vehicle and the vehicle 100. When an object present around the vehicle is detected, the millimeter-wave radar 121 outputs a signal indicating the detection result to the onboard controller 150.

The GPS 122 receives GPS satellite signals for detecting the absolute position of the vehicle 100 on which the GPS 122 is mounted. The GPS 122 specifies the position of the vehicle 100 on the basis of the received GPS satellite signals and outputs longitude and latitude information indicating the specified position to the onboard controller 150.

The onboard communication instrument 123 acquires information indicating running speeds or longitude and latitude information of other vehicles, for example, by vehicle-vehicle communications with other vehicles present around the vehicle 100 and outputs the acquired information to the onboard controller 150. The onboard communication instrument 123 acquires infrastructure information by road-vehicle communications with an optical beacon road machine B (see FIG. 2) and outputs the acquired infrastructure information to the onboard controller 150. The infrastructure information includes, for example, information on legal restrictions (such as inhibition of lane change or exclusive lane) in traffic lanes entering a point of intersection.

Map information registered in a map information database 130 includes information indicating curves, points of intersection, one-way roads, temporary stop positions, crossings, traffic lights, and longitude and latitude of facilities. The map information also includes, for example, information indicating that a type of a traffic light is an arrow type traffic light.

The onboard system 101 includes a navigation system 131 that performs route guidance of the vehicle 100. The navigation system 131 acquires a current point of the vehicle 100 from the onboard controller 150 to which the detection result of the GPS 122 is input. The navigation system 131 searches for a traveling route from the current point (first point) to a destination point (second point) of the vehicle 100 with reference to the map information database 130 using a Dijkstra's algorithm or the like and outputs the searched traveling route to the onboard controller 150.

The onboard controller 150 of this embodiment includes a section setting unit 151, a vehicle characteristic storage unit 152, a driving characteristic storage unit 153, and a guidance information generating unit 154. The section setting unit 151 sets the traveling route from the current point to the destination point of the vehicle 100 input from the navigation system 131 as a traveling section of the vehicle 100.

The vehicle characteristic storage unit 152 stores, for example, the weight of the vehicle 100 or the width of the vehicle 100 as characteristic information of the vehicle 100. This information is set in advance as fixed values at the time of initially setting the vehicle 100. The vehicle characteristic storage unit 152 may calculate the driving force of the vehicle 100 and the acceleration of the vehicle 100 when the vehicle 100 runs, then may estimate the weight of the vehicle 100 as a variable value on the basis of the calculated value, and may store the estimated value of the weight of the vehicle 100 as the characteristic information of the vehicle 100.

The driving characteristic storage unit 153 calculates the running history of the vehicle 100 including the average vehicle speed of the vehicle 100, the average inter-vehicle distance of the vehicle 100, the running frequency of the left lane in sections in which street parking frequently occurs, the occurrence probability of sudden lane change at the respective running positions of the vehicle 100, and the steering operation frequency at the running positions of the vehicle 100 as information indicating the driving characteristics of a driver of the vehicle 100.

Specifically, the driving characteristic storage unit 153 calculates the vehicle speed on the basis of the signal input from the vehicle speed sensor 115 and calculates the average vehicle speed of the vehicle 100 using the calculated vehicle speed. The driving characteristic storage unit 153 calculates the inter-vehicle distance that is a distance between the vehicle 100 and a preceding vehicle on the basis of the signal input from the millimeter-wave radar 121 and calculates the average inter-vehicle distance of the vehicle 100 using the calculated inter-vehicle distance. The driving characteristic storage unit 153 may calculate the inter-vehicle distance on the basis of the image signal of a preceding vehicle imaged with the onboard camera 120 and may calculate the inter-vehicle distance by vehicle-vehicle communications or road-vehicle communications of the onboard communication instrument 123.

The driving characteristic storage unit 153 specifies a traffic lane in which the vehicle 100 runs on the basis of the image signal of a lane boundary imaged with the onboard camera 120. The driving characteristic storage unit 153 may receive the image signal of the vehicle 100 imaged with a camera installed in the optical beacon road machine B by the road-vehicle communications of the onboard communication instrument 123 and may specify the lane in which the vehicle 100 runs on the basis of the received image signal. The driving characteristic storage unit 153 specifies a section in which street parking frequently occurs on the basis of the signal transmitted from the control center 200 to the onboard communication instrument 123 via the optical beacon road machine B. The driving characteristic storage unit 153 calculates the frequency in which the vehicle 100 runs in the left lane in the specified section.

The driving characteristic storage unit 153 determines that the sudden lane change of the vehicle 100 occurs when the variation in the detected value of the steering angle of the steering wheel input from the steering angle sensor 112 is greater than a predetermined threshold value. The driving characteristic storage unit 153 may determine that the sudden lane change of the vehicle 100 occurs when the detected value of the yaw rate of the vehicle 100 input from the yaw rate sensor 113 is greater than a predetermined threshold value. The driving characteristic storage unit 153 may determine that the sudden lane change of the vehicle 100 occurs when the transverse acceleration of the vehicle 100 input from the acceleration sensor 114 is greater than a predetermined threshold value. The driving characteristic storage unit 153 may receive the image signal of the vehicle imaged with the camera installed in the optical beacon road machine B by the road-vehicle communications of the onboard communication instrument 123 and may determine whether the sudden lane change of the vehicle 100 occurs. The driving characteristic storage unit 153 determines whether the sudden lane change of the vehicle occurs for each traffic lane. The driving characteristic storage unit 153 stores the determination result of whether the sudden lane change of the vehicle 100 occurs in correlation with the position acquired from the GPS 122 as the running position of the vehicle 100 at the time of the determination.

The driving characteristic storage unit 153 calculates the steering operation frequency at the respective running positions of the vehicle 100 by storing the detection result of the steering operation based on the signal input from the steering angle sensor 112 in correlation with the position acquired from the GPS 122 as the running position of the vehicle 100 at the time of the detection. The driving characteristic storage unit 153 may detect the steering operation on the basis of the detected value of the yaw rate of the vehicle 100 input from the yaw rate sensor 113. The driving characteristic storage unit 153 may determine the steering operation on the basis of the detected value of the transverse acceleration of the vehicle 100 input from the acceleration sensor 114. The driving characteristic storage unit 153 may detect the steering operation by analyzing an image captured with the onboard camera 120 and calculating movement in the transverse direction relative to a preceding vehicle.

The guidance information generating unit 154 receives information on a recommended lane in which the vehicle 100 has to run in the section set by the section setting unit 151 from the control center 200 via the onboard communication instrument 123. The guidance information generating unit 154 generates guidance information for urging a driver to run in the received recommended lane and outputs the generated guidance information to a human machine interface (HMI) 132 as the guidance information output unit.

The HMI 132 is constituted, for example, by a speaker, a head-up display, a monitor of the navigation system 131, and a meter panel. When the guidance information is input from the guidance information generating unit 154, the HMI 132 rings an alarm for urging the driver to run in the recommended lane by voice via the speaker or displays an warning on the head-up display.

The control center 200 includes a center controller 210 that controls various units and a center communication instrument 211 and a map information database 212 that are electrically connected to the center controller 210.

The control center 200 collects vehicle information of the vehicle 100 on which the onboard system 101 is mounted from plural vehicles 100. That is, the vehicle information accumulated by each vehicle 100 is transmitted from the onboard communication instrument 123 to the center communication instrument 211 by radio communications and is then input from the center communication instrument 211 to the center controller 210. Information is transmitted and received between the onboard communication instrument 123 and the center communication instrument 211 with a constant time cycle by radio communications. The center controller 210 stores the input vehicle information for each vehicle in a vehicle database 220.

The vehicle database 220 includes a section storage unit 221, a vehicle characteristic storage unit 222, and a driving characteristic storage unit 223. The section storage unit 221 stores information of the running section set by the section setting unit 151 of the vehicle 100 by vehicles on the basis of vehicle IDs included in the information transmitted from the vehicles 100. The section storage unit 221 updates the stored information of the running sections whenever the information of the running section is transmitted from the vehicles 100 with a constant time cycle.

The vehicle characteristic storage unit 222 stores the characteristic information of the vehicle 100 stored in the vehicle characteristic storage unit 152 of the vehicle 100 by vehicles on the basis of the vehicle IDs included in the information transmitted from the vehicles 100. When the characteristic information of the vehicle 100 stored in the vehicle characteristic storage unit 152 of the vehicle 100 is a fixed value, the vehicle characteristic storage unit 222 does not update the stored information of the vehicle characteristics of the vehicles 100 whenever the characteristic information of the vehicle 100 is transmitted from the vehicles 100 with a constant time cycle. On the other hand, when the characteristic information of the vehicle 100 stored in the vehicle characteristic storage unit 152 of the vehicle 100 is a variable value, the vehicle characteristic storage unit 222 updates the stored characteristic information of the vehicles 100 whenever the characteristic information of the vehicle 100 is transmitted from the vehicles 100 with a constant time cycle.

The driving characteristic storage unit 223 stores information of the driving characteristics of the vehicle 100 stored in the driving characteristic storage unit 153 of the vehicle 100 by vehicles on the basis of the vehicle IDs included in the information transmitted from the vehicles 100. The driving characteristic storage unit 223 updates the stored information of the driving characteristics whenever the information of the driving characteristics of the vehicle 100 is transmitted from the vehicles 100 with a constant time cycle.

The center controller 210 stores the vehicle information input from the plural vehicles 100 as statistical information in a statistics database 230. The statistics database 230 includes an average vehicle speed storage unit 231, an average inter-vehicle distance storage unit 232, and an occurrence probability storage unit 233.

The average vehicle speed storage unit 231 collects information of the average vehicle speed of the vehicle 100 stored as a part of the driving characteristics of the vehicle 100 in the driving characteristic storage unit 153 of the vehicle 100 from plural vehicles 100 and calculates the average value of the collected average vehicle speeds of the plural vehicles 100 as statistical information.

The average inter-vehicle distance storage unit 232 collects information of the average inter-vehicle distance of the vehicle 100 stored as a part of the driving characteristics of the vehicle 100 in the driving characteristic storage unit 153 of the vehicle 100 from plural vehicles 100 and calculates the average value of the collected average inter-vehicle distances of the plural vehicles 100 as statistical information.

The occurrence probability storage unit 233 collects information of the occurrence probability of sudden lane change at the respective running positions stored as a part of the driving characteristics of the vehicle 100 in the driving characteristic storage unit 153 of the vehicle 100 from plural vehicles 100 and calculates the average value of the collected occurrence probabilities of sudden lane change of the plural vehicles 100 as statistical information for each running position of the vehicle 100. The occurrence probability storage unit 233 calculates the average value of the occurrence probabilities of sudden lane change of the vehicle 100 for each position individually corresponding to the links L (see FIG. 2) in the map information registered in the map information database 212.

Figure 2:
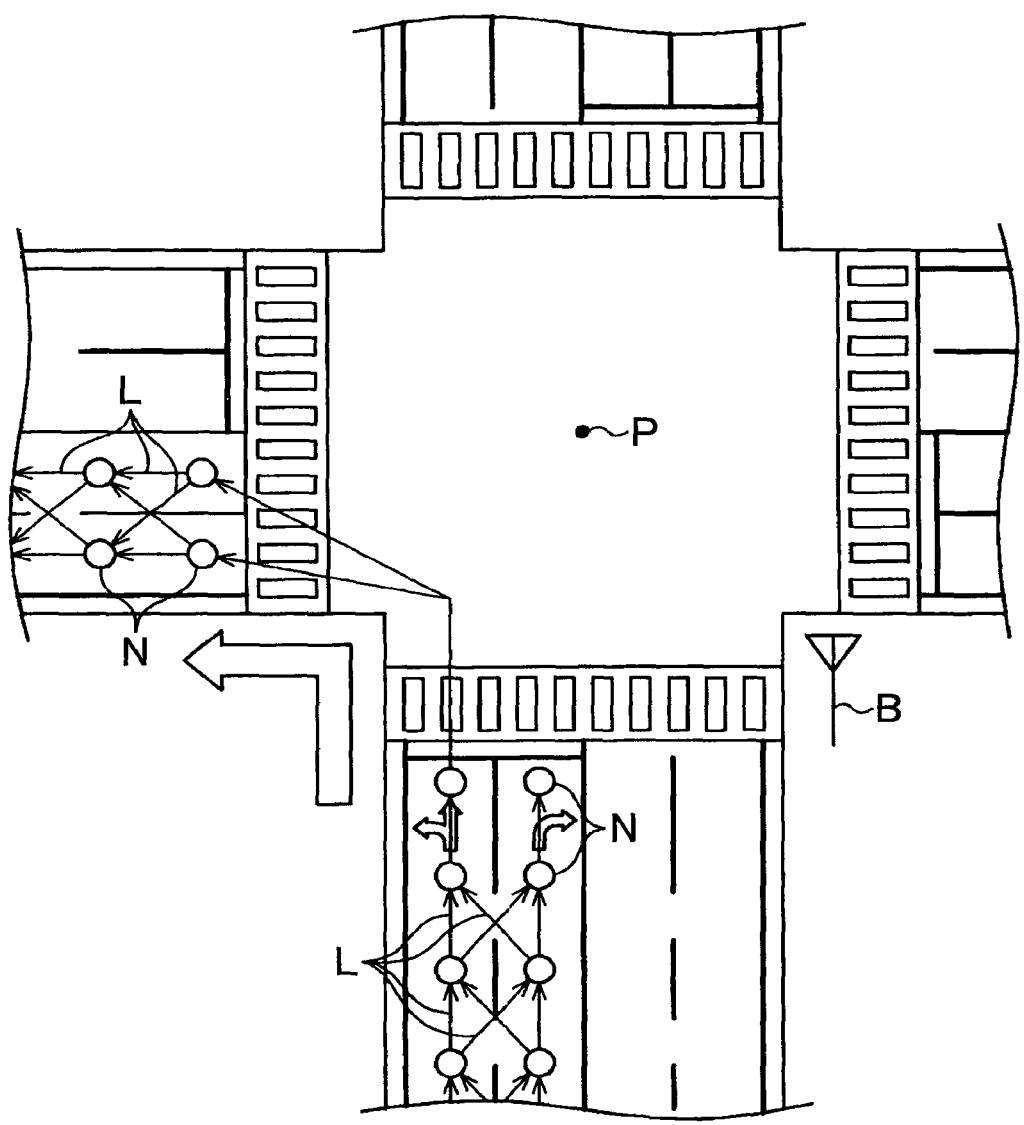
FIG. 2 is a diagram schematically illustrating map information used for the traffic lane guidance system for a vehicle according to the first embodiment to set a recommended lane.

As illustrated in FIG. 2, the map information registered in the map information database 212 includes node information that is information on the nodes N indicating the positions on roads and link information that is information on links L. In this embodiment, the nodes N are set at plural positions spaced at constant intervals in the traveling direction of the vehicle 100 for each traffic lane. The node information includes the position information of the nodes N or the road information for each traffic lane at the positions of the nodes N. The link L is set as a section defined by two nodes N between the two nodes N. The link information includes the road information for each traffic lane in the section of the link L. The road information includes information indicating a running load when the vehicle 100 runs in the section of the link L, information indicating the type of the road, information indicating the gradient of the road, or information indicating the width and the road surface resistance of the traffic lane. The running load is defined on the basis of movement time, movement speed, fuel consumption, power consumption, and the like.

In this case, a link L connecting two nodes N arranged in the traveling direction of the vehicle 100 in the same traffic lane corresponds to the direct advance of the vehicle 100. On the other hand, a link L connecting two nodes N arranged in the direction intersecting the traveling direction of the vehicle in neighboring traffic lanes corresponds to the lane change of the vehicle 100.

In a place in which the lane change is inhibited by legal restrictions, a link L is not set to connect two nodes N arranged in the direction intersecting the traveling direction of the vehicle in the neighboring traffic lanes. In the example illustrated in FIG. 2, in a constant section located in front of a stop line of the vehicle 100 at a point of intersection P, a link L is not set to connect two nodes N arranged in the direction intersecting the traveling direction of the vehicle in the neighboring traffic lanes. In the example illustrated in FIG. 2, a link L is not set to connect a node N located in the vicinity of a stop line of the right lane set as a lane dedicated to the right turn in the section through which the vehicle 100 passes before turning left at the point of intersection P and a node N of the lane in the section through which the vehicle passes after turning left at the point of intersection P.

As illustrated in FIG. 1, a cost calculating unit 240 as the predicted value calculating unit in the center controller 210 calculates a cost Cost of the link L which is the predicted value of the occurrence probability of sudden lane change in the link L set in the map information on the basis of the information read from the statistics database 230 and the vehicle database 220.

Specifically, the cost calculating unit 240 calculates the cost Cost of the link L on the basis of Expression (1).

$$\text{cost} = Pa + (Pi - Pa) \times \frac{\log(Di+1)}{\log(Dj+1)} + K1 + K2 + K3 \quad \text{Expression (1)}$$

Here, Pa represents an average value of the occurrence probabilities of sudden lane change of plural vehicles 100 in all the links L included in the traveling route from the current point to the destination point and is calculated as an average value of the occurrence probabilities of sudden lane change in all the links L stored in the occurrence probability storage unit 233 of the statistics database 230. Pi represents an average value of the occurrence probabilities of sudden lane change of plural vehicles 100 in a target link L and is stored in the occurrence probability storage unit 233 of the statistics database 230. Di represents an information quantity of the statistical information used to calculate Pi. In this embodiment, the number of vehicles of which the statistical information is collected is defined as the information quantity of the statistical information. Dj is defined as a value serving as the reference of the information quantity of the statistical information when determining whether the value of Pi is used as the predicted value of the occurrence probability of sudden lane change in the target link L.

Figure 3:
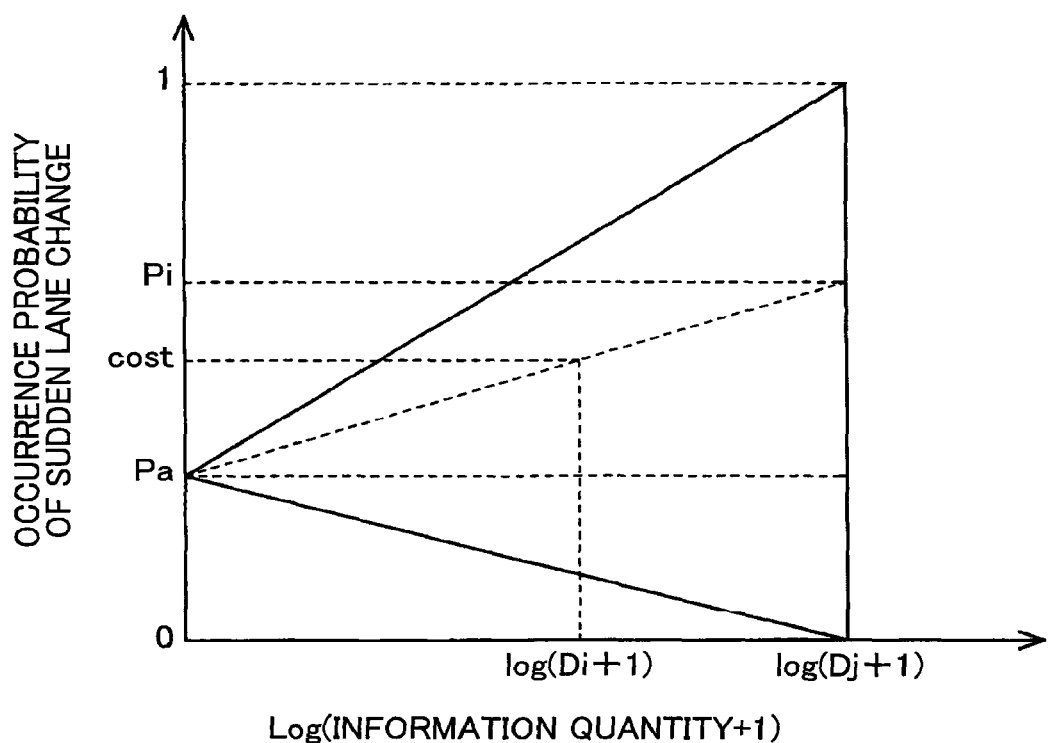
FIG. 3 is a graph illustrating a correlation between a prediction value of an occurrence probability of sudden lane change and an information quantity of statistical information.

As illustrated in FIG. 3, the difference between the cost value Cost of the link L and the value of Pi decreases as the value of Di as the information quantity of the statistical information used to calculate Pi increases. This is because the larger the value of Di as the information quantity of the statistical information becomes, the higher the reliability of Pi calculated using the statistical information becomes.

K1 represents a first addition value for weighting the predicted value of the occurrence probability of sudden lane change in the link L in consideration of whether the target link L is a link L corresponding to the lane change of the vehicle 100 and satisfies a relational expression of $K1 = \alpha 1 \times C$.

Here, $\alpha 1$ is a coefficient indicating a degree of weighting based on whether the target link L is the link L corresponding to the lane change of the vehicle 100 at the time of calculating the cost Cost of the link L. C varies depending on whether the target link L is a link L corresponding to the lane change of the vehicle 100. In this embodiment, C is set to 1 when the target link L is the link L corresponding to the lane change of the vehicle 100, and is set to 0 when the target link L is the link L corresponding to the direct advance of the vehicle 100. Accordingly, the first addition value K1 that is added to the cost Cost of the link L set by connecting two nodes N in the direction intersecting the traveling direction of the vehicle 100 is greater than the first addition value K1 that is added to the cost Cost of the link L set by connecting two nodes N in the traveling direction of the vehicle 100.

Weight is a correction coefficient for correcting the degree of weighting of the first addition value K1 for the cost Cost and is expressed by Expression (2).

$$\text{Weight} = e^{-\frac{L^2}{2\sigma^2}} \quad \text{Expression (2)}$$

L is a value indicating a distance from a specific point. $\sigma$ is a coefficient for defining what the degree of weighting varies depending on the value of L. Here the specific point means a point at which the steering operation frequency of the vehicle is greater than a predetermined threshold value.

Figure 4:
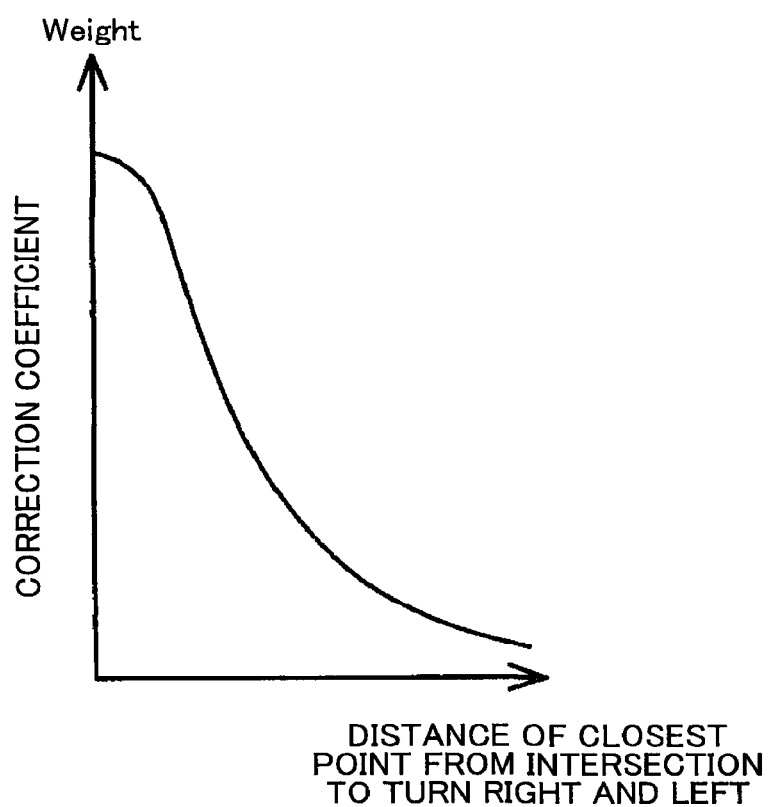
FIG. 4 is a graph illustrating a correlation between a correction coefficient and a distance from a point of intersection.

As illustrated in FIG. 4, the value of weight gradually increases as the distance from the specific point decreases. This is because since the driver's burden when the sudden lane change of the vehicle 100 occurs is great at the time of performing the lane change of the vehicle 100 while performing the steering operation of the vehicle, it is necessary to increase the weighting value of the first addition value K1 at the time of calculating the cost Cost of the link L.

In this embodiment, a point of right and left turns, a point of a sharp curve, a point of intersection, and a point at which the number of traffic lanes decreases are set as the specific point. Information for identifying these points is included in advance in the link information of the map information registered in the map information database 212.

In this embodiment, a destination point of the traveling section stored in the section storage unit 221 of the vehicle database 220 is also set as the specific point. When the destination of the traveling section is set, information for identifying the destination point is added to the link information of the map information registered in the map information database 212.

In this embodiment, a point at which the steering operation is frequently performed when the vehicle 100 actually runs is also set as the specific point. This point is set on the condition that the steering operation frequency is greater than a predetermined threshold value when the steering operation frequency is stored as a part of the driving characteristics of the vehicle 100 in the driving characteristic storage unit 223 of the vehicle database 220. Information for identifying this point is added to the link information of the map information registered in the map information database 212.

K2 in Expression (1) is a second addition value for weighting the predicted value of the occurrence probability of sudden lane change in the link L in consideration of the appropriateness of personal driving characteristics in the section corresponding to the link L and satisfies a relational expression of $K2=\alpha 2 \times (X1/X2)$.

Here, $\alpha 2$ is a coefficient indicating a degree of weighting of the appropriateness of personal driving characteristics in the section corresponding to the link L at the time of calculating the cost Cost of the link L. In this embodiment, X1 represents the average value of the average vehicle speeds of plural vehicles 100 and is stored in the average vehicle speed storage unit 231 of the statistics database 230. On the other hand, X2 represents the value of the average vehicle speed of a guidance target vehicle 100 and is stored in the driving characteristic storage unit 223 of the vehicle database 220.

Accordingly, when the average vehicle speed of plural vehicles 100 in the section corresponding to the link L is high, the value of the second addition value K2 increases with the increase in the value of X1. However, when the average vehicle speed of the guidance target vehicle 100 is also high, the increase of the second addition value K2 is suppressed with the increase in the value of X1 due to the increase in the value of X2. That is, the appropriateness for a section in which the average vehicle speed of plural vehicles 100 is high is high when the average vehicle speed of the guidance target vehicle 100 is high. Accordingly, the second addition value K2 is set by considering that the driver's burden decreases when the sudden lane change occurs in the same section.

The average value of the average inter-vehicle distances of the guidance target vehicle 100 stored in the driving characteristic storage unit 223 of the vehicle database 220 may be used as X1 and the average value of the average inter-vehicle distances of plural vehicles 100 stored in the average inter-vehicle distance storage unit 232 of the statistics database 230 may be used as X2. In this case, when the average inter-vehicle distances of plural vehicles 100 in the section corresponding to the link L is small, the value of the second addition value K2 increases with the decrease in the value of X2. However, when the average inter-vehicle distance of the guidance target vehicle 100 is also small, the increase of the second addition value K2 is suppressed with the decrease in the value of X2 due to the decrease in the value of X1. That is, the appropriateness for a section in which the average inter-vehicle distance of plural vehicles 100 is small is high when the average inter-vehicle distance of the guidance target vehicle 100 is small. Accordingly, the second addition value K2 is set by considering that the driver's burden decreases when the sudden lane change occurs in the same section.

K3 in Expression (1) is a third addition value for weighting the predicted value of the occurrence probability of sudden lane change in the link L in consideration of the appropriateness of the personal vehicle characteristics in the section corresponding to the link L and satisfies a relational expression of $K3=\alpha 3 \times (Y1/Y2)$.

Here, $\alpha 3$ is a coefficient indicating a degree of weighting of the appropriateness of the personal vehicle characteristics in the section corresponding to the link L at the time of calculating the cost Cost of the link L. In this embodiment, Y1 represents the value of the vehicle width of the guidance target vehicle 100 and is stored in the vehicle characteristic storage unit 222 of the vehicle database 220. On the other hand, Y2 represents the value of the lane width of the section corresponding to the link L and is included in the link information of the map information registered in the map information database 212.

Accordingly, when the lane width of the section corresponding to the link L is small, the value of the third addition value K3 increases with the decrease in the value of Y2. However, when the vehicle width of the guidance target vehicle 100 is small, the increase of the third addition value K3 is suppressed with the decrease in the value of Y2 due to the decrease in the value of Y1. That is, the appropriateness for the section in which the lane width is small is high when the vehicle width of the guidance target vehicle 100 is small. Accordingly, the third addition value K3 is set by considering that the driver's burden decreases when the sudden lane change occurs in the same section.

The third addition value K3 may be set to satisfy a relational expression of $K3=\alpha 3 \times (1/(Y1a \times Y2a))$, the value of the weight of the guidance target vehicle 100 stored in the vehicle characteristic storage unit 222 of the vehicle database 220 may be used as Y1a, and the value of the road surface resistance of the section corresponding to the link L included in the link information of the map information registered in the map information database 212 may be used as Y2a. In this case, when the value of the road surface resistance of the section corresponding to the link L is small, the value of the third addition value K3 increases with the decrease in the value of Y2a. However, when the weight of the guidance target vehicle 100 is large, the increase of the third addition value K3 is suppressed with the decrease in the value of Y2a due to the increase in the value of Y1a. That is, the appropriateness for the section in which the value of the road surface resistance is small is high when the weight of the guidance target vehicle 100 is large. Accordingly, the third addition value K3 is set by considering that the driver's burden decreases when the sudden lane change occurs in the same section.

A recommended lane setting unit 241 of the center controller 210 searches for a traveling route in which the total sum of the costs of the links L calculated by the cost calculating unit 240 is minimized in the traveling sections stored in the section storage unit 221 using a Dijkstra's algorithm or the like. The recommended lane setting unit 241 sets a traffic lane located in the searched traveling route as a recommended lane and outputs information of the set recommended lane to the center communication instrument 211. Accordingly, the information of the recommended lane set by the recommended lane setting unit 241 is transmitted from the center communication instrument 211 to the onboard communication instrument 123 by radio communications and is then input from the onboard communication instrument 123 to the onboard controller 150.

Figure 5:
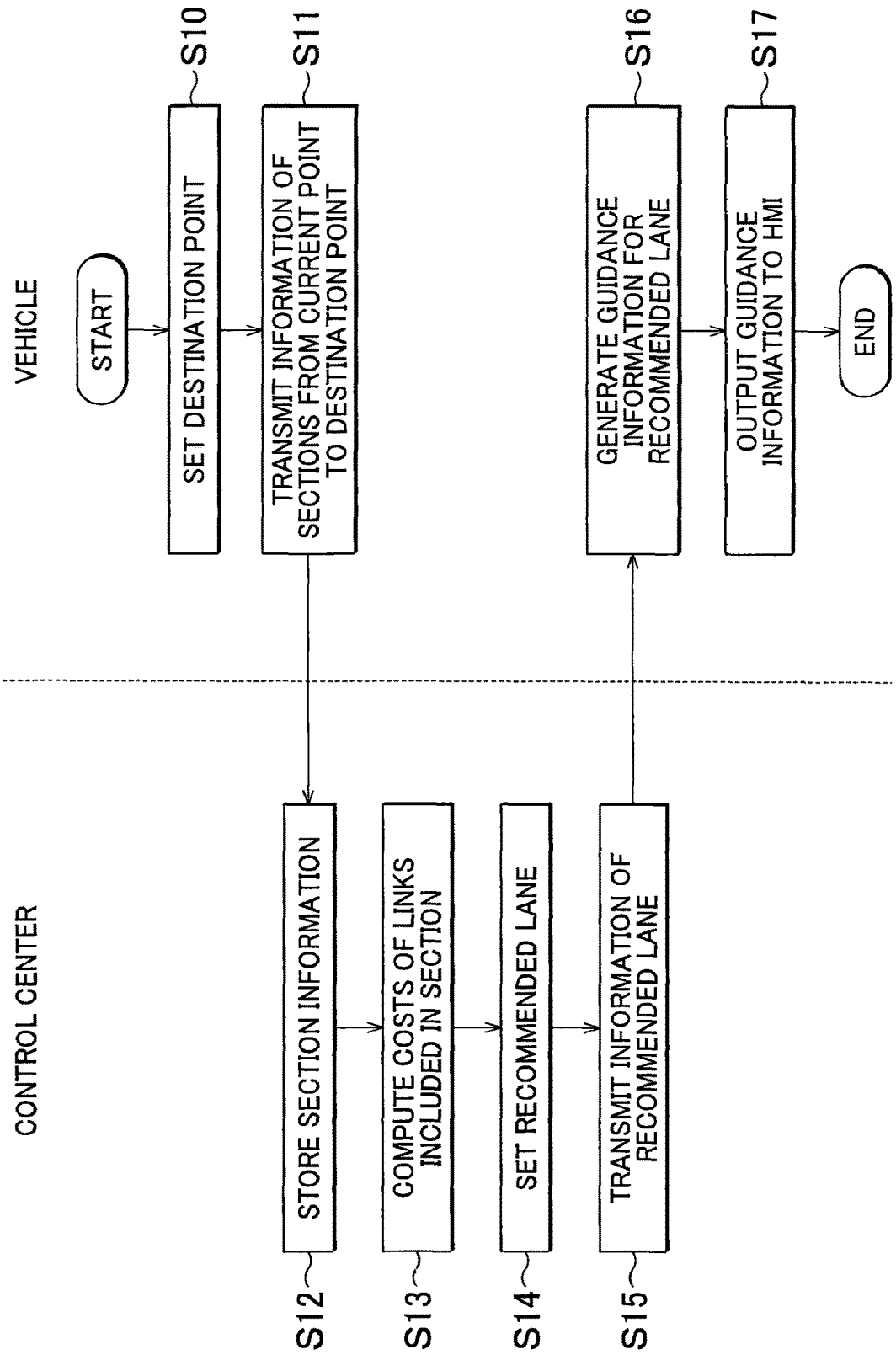
FIG. 5 is a flowchart illustrating schematically illustrating a process flow of a recommended lane guiding process that is performed by the traffic lane guidance system for a vehicle according to the first embodiment.

The process flow of the recommended lane guiding process that is performed by the traffic lane guidance system for a vehicle according to this embodiment will be described below in brief with reference to the flowchart illustrated in FIG. 5. As illustrated in FIG. 5, in step S10, the navigation system 131 sets a destination point on the basis of a driver's input operation and inputs the information of the traveling route from the current point to the destination point to the onboard controller 150. Then, the section setting unit 151 of the onboard controller 150 sets the traveling route input from the navigation system 131 as the traveling route of the vehicle 100.

Then, in step S11, the onboard controller 150 outputs the information of the traveling route of the vehicle set by the section setting unit 151 to the onboard communication instrument 123. Then, the information of the traveling route of the vehicle 100 is transmitted from the onboard communication instrument 123 to the center communication instrument 211 by radio communications is then input from the center communication instrument 211 to the center controller 210.

Subsequently, in step S12, the center controller 210 stores the information of the traveling route of the vehicle 100 input from the center communication instrument 211 in the section storage unit 221. Then, in step S13, the cost calculating unit 240 of the center controller 210 calculates the costs of links L included in the traveling route of the vehicle 100 stored in the section storage unit 221 as a predicted value calculating step.

Figure 6:
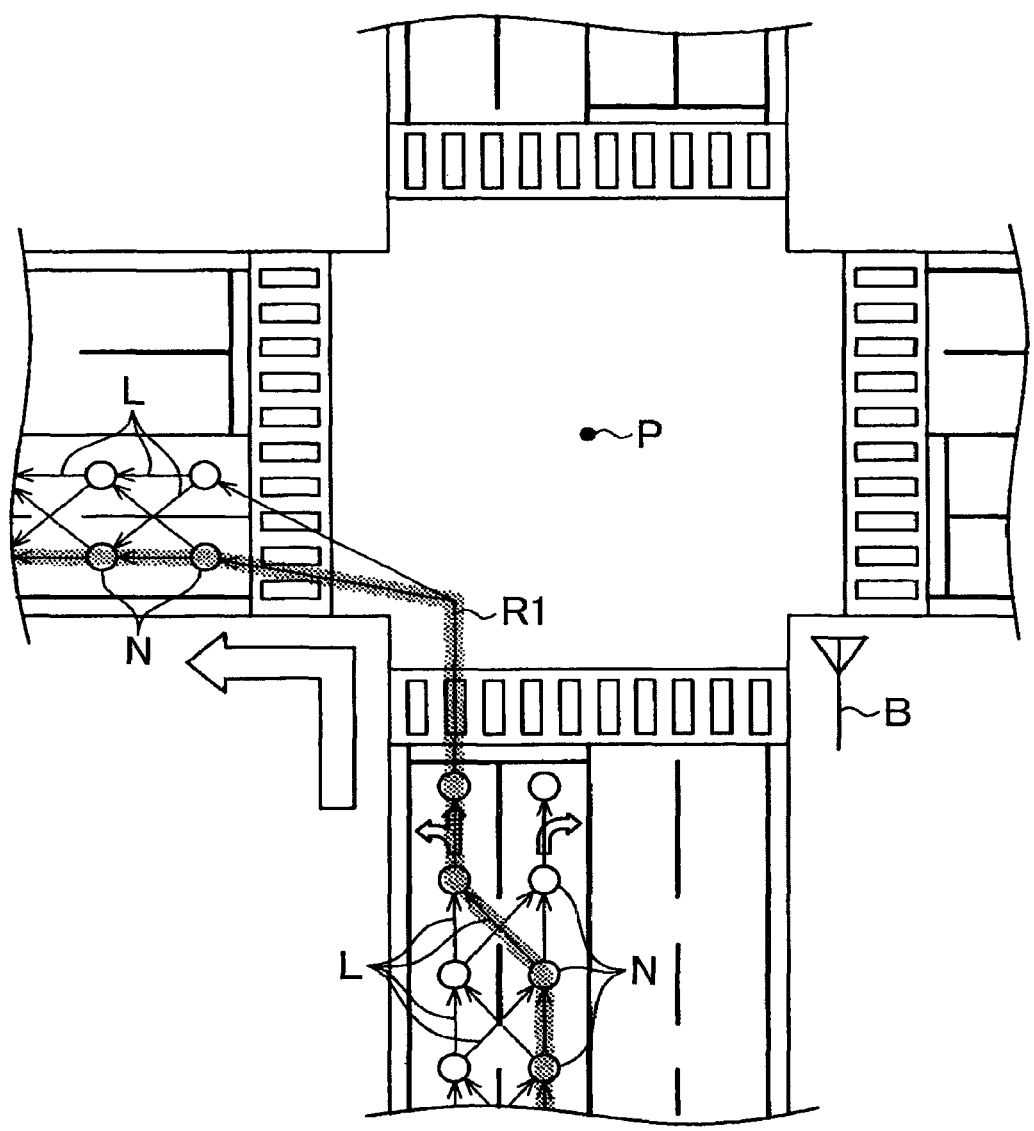
FIG. 6 is a schematic diagram illustrating an example of a recommended lane set by the traffic lane guidance system for a vehicle according to the first embodiment.

Subsequently, in step S14, the recommended lane setting unit 241 of the center controller 210 searches for a traveling route in which the total sum of the costs of the links L calculated by the cost calculating unit 240 is minimized using the Dijkstra's algorithm or the like. In the example illustrated in FIG. 6, the traveling route R1 in which the total sum of the costs of the links L is minimized is displayed by half-tone dot meshing. The recommended lane setting unit 241 sets a lane located in the searched traveling route R1 as the recommended lane.

Then, in step S15, the recommended lane setting unit 241 outputs the information of the set recommended lane to the center communication instrument 211. Then, the information of the recommended lane is transmitted from the center communication instrument 211 to the onboard communication instrument 123 by radio communications and is then input from the onboard communication instrument 123 to the onboard controller 150.

Subsequently, in step S16, the guidance information generating unit 154 of the onboard controller 150 generates guidance information for urging the driver to run in the recommended lane on the basis of the information of the recommended lane input from the onboard communication instrument 123 as a guidance information generating step.

Then, in step S17, the guidance information generating unit 154 outputs the generated guidance information to the HMI 132. As a result, the HMI 132 gives an alarm for urging the driver to run in the recommended lane on the basis of the guidance information input from the guidance information generating unit 154.

The operation of the traffic lane guidance system for a vehicle according to this embodiment will be described below. When the vehicle 100 is guided to a recommended lane in which the vehicle 100 has to run in the traveling route from a current point to a destination point, first, the costs of the links L included in the traveling route are calculated as the predicted values of the occurrence probability of sudden lane change of the vehicle 100 in the links L. Then, a traffic lane located in the traveling route in which the total sum of the costs of the links L is minimized is set as a recommended lane in which the vehicle 100 is recommended to run in the traveling route from the current point to the destination point. That is, the optimal traffic lane for suppressing the occurrence of sudden lane change of the vehicle 100 is set as the recommended lane in consideration of the entire route from the current point to the destination point.

In this case, the cost of a link L is calculated using the statistical information of the previous occurrence probabilities of sudden lane change of plural vehicles 100 in the same link L. Accordingly, when the information quantity of the statistical information is small, the reliability of the cost value of the link L calculated using the statistical information is not satisfactorily obtained. Therefore, it is difficult to appropriately search for a recommended lane in which the vehicle 100 has to run in the traveling route from the current point to the destination point on the basis of the calculated cost values of the links L.

Accordingly, in this embodiment, the calculated cost value of the link L is corrected in consideration of the information quantity of the statistical information used to calculate the cost of the link L. As a result, it is possible to appropriately search for a recommended lane in which the vehicle 100 has to run in the traveling route from the current point to the destination point on the basis of the corrected cost values.

As described above, according to the first embodiment, the following advantages can be obtained. (1) The cost calculating unit 240 calculates the cost as the predicted value of the occurrence probability of sudden lane change when the vehicle 100 runs in the route from the current point to the destination point for each section corresponding to the links L. The route in which the sudden lane change of the vehicle 100 does not occur well is extracted from the route from the current point to the destination point on the basis of the calculated costs and the traffic lane included in the extracted route is set as the recommended lane. That is, the recommended lane is set to a traffic lane in which the occurrence of the sudden lane change of the vehicle 100 can be suppressed in consideration of the entire route from the current point to the destination point. Accordingly, by causing the guidance information generating unit 154 to generate guidance information for the set recommended lane and to output the generated guidance information to the HMI 132, it is possible to guide the vehicle to a traffic lane more suitable for suppressing the occurrence of the sudden lane change of the vehicle 100.

(2) The recommended lane setting unit 241 sets the traffic lane included in the route in which the total sum of the costs as the predicted values of the occurrence probability of sudden lane change is minimized in the route from the current point to the destination point as the recommended lane. Accordingly, the traffic lane included in the route in which the sudden lane change of the vehicle 100 occurs less in consideration of the entire route from the current point to the destination point is set as the recommended lane.

(3) The recommended lane setting unit 241 determines the traffic lane included in the route in which the total sum of the costs as the predicted values of the occurrence probability of sudden lane change is minimized by applying a Dijkstra's algorithm to the cost as the predicted value of the occurrence probability of sudden lane change calculated for each link L included in the route from the current point to the destination point. Accordingly, it is possible to easily implement a configuration for determining the route in which the total sum of the costs as the predicted values of the occurrence probability of sudden lane change is minimized in the route from the current point to the destination point.

(4) The weighting value of the first addition value K1 for the cost as the predicted value of the occurrence probability of sudden lane change in a link L corresponding to the section in which the vehicle 100 runs at the time of changing the traffic lane is set to be greater than that for the predicted value in a link L corresponding to a section in which the vehicle 100 runs straightly in a traffic lane. That is, the weighting value is set for the costs as the predicted values of the occurrence probability of sudden lane change depending on situations in consideration of the variation of the driver's burden when the sudden lane change occurs depending on whether to change the lane. Accordingly, it is possible to guide the vehicle to a traffic lane more suitable for suppressing the occurrence of the sudden lane change of the vehicle 100 depending on the situations.

(5) As the running position of the vehicle 100 becomes closer to the point of intersection P, the weighting value of the first addition value K1 for the cost as the predicted value of the occurrence probability of sudden lane change in the link L corresponding to the section in which the vehicle 100 runs at the time of changing the traffic lane is set to be greater. That is, the weighting value for the cost as the predicted value of the occurrence probability of sudden lane change is changed depending on the situations in consideration of the variation of the driver's burden when the sudden lane change occurs due to the variation in the distance from the point of intersection P. Accordingly, it is possible to guide the vehicle to a traffic lane more suitable for suppressing the occurrence of the sudden lane change of the vehicle at a point of intersection P or the like depending on the situation.

(6) The weighting value for the cost as the predicted value of the occurrence probability of sudden lane change is changed depending on the situations by changing the weighting value of the second addition value K2 for the cost as the predicted value of the occurrence probability of sudden lane change in the link L in consideration of the variation of the driver's burden when the sudden lane change occurs due to the appropriateness of the personal driving characteristics for the section corresponding to the link L. Accordingly, it is possible to guide the vehicle to a traffic lane more suitable for suppressing the occurrence of the sudden lane change of the vehicle 100 depending on the personal driving characteristics.

(7) The weighting value for the predicted value of the occurrence probability of sudden lane change is changed depending on the situations by changing the weighting value of the third addition value K3 for the cost as the predicted value of the occurrence probability of sudden lane change in the link L in consideration of the variation of the driver's burden when the sudden lane change occurs due to the appropriateness of the vehicle characteristics for the section corresponding to the link L. Accordingly, it is possible to guide the vehicle to a traffic lane more suitable for suppressing the occurrence of the sudden lane change of the vehicle depending on the situation.

(8) The nodes N include plural positions spaced in the traveling direction of the vehicle 100 in the traffic lanes of the route portion between neighboring points of intersection P in the route from the current point to the destination point. Accordingly, since more nodes N than the nodes N when the nodes N are set at only the positions corresponding to the points of intersection P in the route are set in the route, it is possible to guide the vehicle to a traffic lane more suitable for suppressing the occurrence of the sudden lane change of the vehicle 100 in more detail.

Second Embodiment

A second embodiment of a traffic lane guidance system for a vehicle and a traffic lane guidance method for a vehicle will be described below with reference to the accompanying drawings. The second embodiment is different from the first embodiment, in the aspect of setting a recommended lane based on the costs of links L. Accordingly, in the following description, a configuration different from that of the first embodiment will be mainly described and description of the configuration identical or corresponding to that of the first embodiment will not be repeated.

In this embodiment, the recommended lane setting unit 241 reads the calculated cost value of a link L connecting a node N corresponding to a destination point of the traveling route stored in the section storage unit 221 and a node N adjacent to the node N in the traveling direction of the vehicle 100.

Then, the recommended lane setting unit 241 determines whether the read calculated cost value of the link L is greater than a predetermined threshold value. The recommended lane setting unit 241 sets a section corresponding to the link L as the recommended lane when it is determined that the read calculated cost value of the link L is not greater than the predetermined threshold value.

On the other hand, when it is determined that the read calculated cost value of the link L is greater than the predetermined threshold value, the recommended lane setting unit 241 reads the calculated cost value of a link L connecting the node N corresponding to the destination point and a node N adjacent to the node N in the direction intersecting the traveling direction of the vehicle 100. Then, the recommended lane setting unit 241 sets a section corresponding to the link L as the recommended lane on the condition that the read calculated cost value of the link L is not greater than the predetermined threshold value. When the read calculated cost value of the link L is greater than the predetermined threshold value, the recommended lane setting unit 241 determines that a traveling route capable of avoiding a local increase in the occurrence probability of sudden lane change is not present in the traveling route stored in the section storage unit 221 and ends the setting of the recommended lane.

Thereafter, the recommended lane setting unit 241 repeatedly performs the above-mentioned process from the destination point side to the current point side of the traveling sections stored in the section storage unit 221. When the above-mentioned process is performed up to the node N corresponding to the current point, the traveling route in which the number of links L set by connecting two nodes N in the direction intersecting the traveling direction of the vehicle 100 is minimized is extracted from the sections stored in the section storage unit 221 on the condition that the link L in which the cost is greater than a predetermined threshold value is not included. That is, the traveling route in which the lane change frequency of the vehicle 100 is minimized while avoiding the occurrence probability of sudden lane change locally increases is extracted from the sections stored in the section storage unit 221. A traffic lane located in the extracted traveling route is set as the recommended lane.

Figure 7:
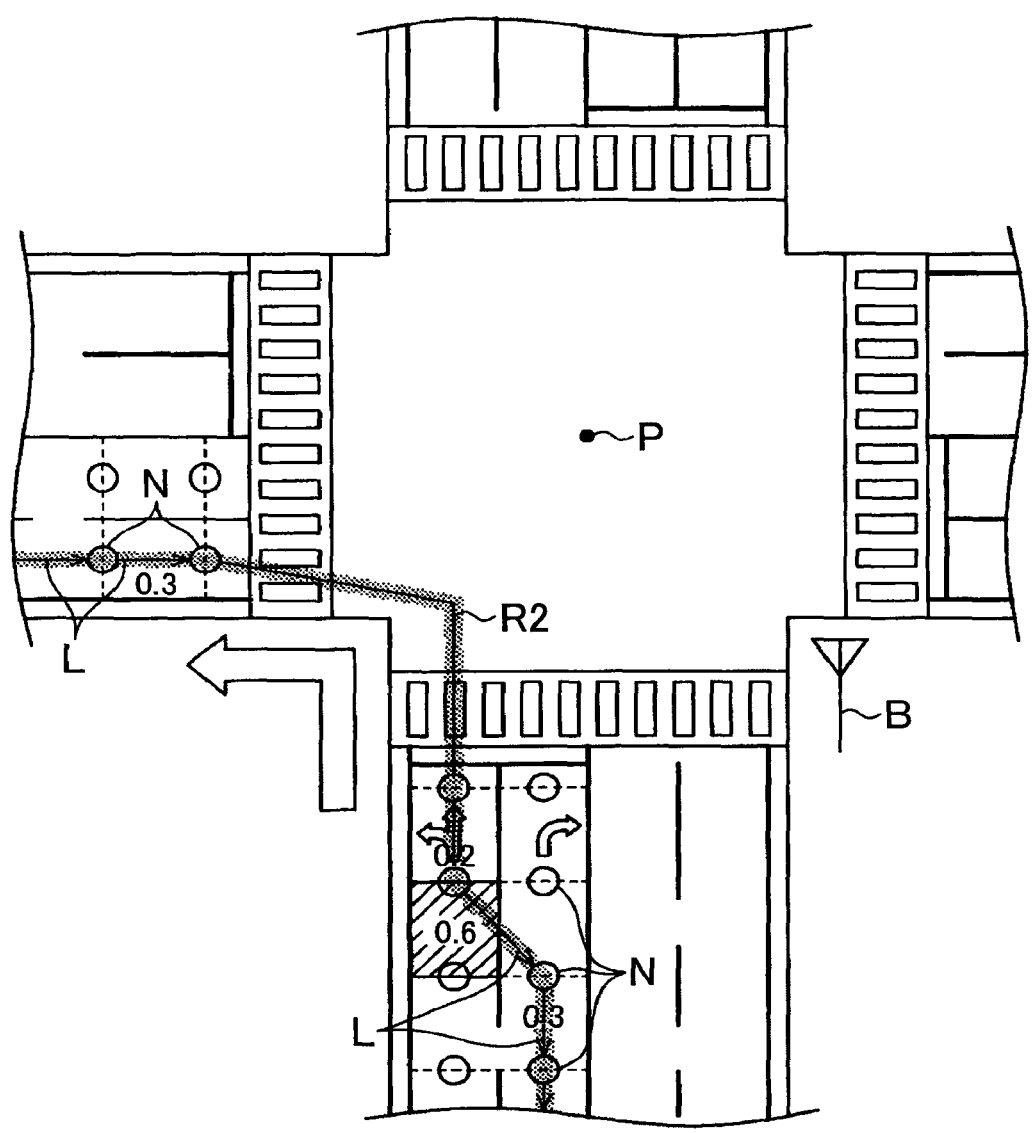
FIG. 7 is a schematic diagram illustrating an example of a recommended lane set by a traffic lane guidance system for a vehicle according to a second embodiment of the invention.

In the example illustrated in FIG. 7, when "0.5" is set as the predetermined threshold value, the calculated cost value of the determination target link L is set to "0.3" in the section through which the vehicle 100 passes after turning left at the point of intersection P. Accordingly, in this section, a traffic lane located in the traveling route R2 in which the vehicle runs straightly in the left lane is set as the recommended lane. On the other hand, in the example illustrated in FIG. 7, the calculated cost value of some links L of the determination target links L is set to "0.6" in the section through which the vehicle 100 passes before turning left at the point of intersection P. Accordingly, in this section, a traffic lane located in the traveling route R2 in which the vehicle runs straightly in the right lane and changes the traffic lane to the left lane in the way is set as the recommended lane.

According to the second embodiment, the following advantage can be obtained in addition to the advantages of (1) and (4) to (8) of the first embodiment. (9) On the premise that a section in which the sudden lane change of the vehicle 100 often occurs is not locally included, a traffic lane included in the route in which the lane change frequency is minimized in the route from the current point to the destination point is set as the recommended lane. That is, since the recommended lane does not locally include a section in which the sudden lane change of the vehicle 100 often occurs and the lane change frequency is minimized, it is possible to guide the vehicle to a traffic lane still more suitable for suppressing the occurrence of the sudden lane change of the vehicle 100.

The above-mentioned embodiments may be embodied in the following configurations. In the above-mentioned embodiments, the nodes N in the map information registered in the map information database 212 may be set as positions of specific traffic elements such as points of intersection, traffic lights, and curves or points at which the number of traffic lanes is changed on a road.

In the above-mentioned embodiments, the cost calculating unit 240 may add an addition value for weighting the predicted value of the occurrence probability of sudden lane change in a link L in consideration of occurrence of sudden braking in the section corresponding to the link L at the time of calculating the cost Cost of the link L. In this case, a relational expression of (addition value)=(weighting coefficient)×(occurrence probability of sudden braking) is satisfied. Accordingly, when the occurrence probability of sudden braking in the section corresponding to the link L increases, the addition value also increases. This is because the driver's burden when the sudden lane change occurs in the same section is considered to increase when the occurrence probability of sudden braking in the section corresponding to the link L is high.

In the above-mentioned embodiments, the cost calculating unit 240 may add an addition value for weighting the predicted value of the occurrence probability of sudden lane change in a link L in consideration of occurrence of passing in the section corresponding to the link L at the time of calculating the cost Cost of the link L. In this case, a relational expression of (addition value)=(weighting coefficient)×(occurrence probability of passing) is satisfied. Accordingly, when the occurrence probability of passing in the section corresponding to the link L increases, the addition value also increases. This is because the driver's burden when the sudden lane change occurs in the same section is considered to increase when the occurrence probability of passing in the section corresponding to the link L is high.

In the above-mentioned embodiments, the cost calculating unit 240 may add an addition value for weighting the predicted value of the occurrence probability of sudden lane change in a link L in consideration of occurrence of right turn waiting of a preceding vehicle in the section corresponding to the link L at the time of calculating the cost Cost of the link L. In this case, a relational expression of (addition value)=(weighting coefficient)×(occurrence probability of right turn waiting of a preceding vehicle) is satisfied. Accordingly, when the occurrence probability of right turn waiting of a preceding vehicle in the section corresponding to the link L increases, the addition value also increases. This is because the driver's burden when the sudden lane change occurs in the same section is considered to increase when the occurrence probability of right turn waiting of a preceding vehicle in the section corresponding to the link L is high.

In the above-mentioned embodiments, the cost calculating unit 240 may add an addition value for weighting the predicted value of the occurrence probability of sudden lane change in a link L in consideration of occurrence of stopping and going in the section corresponding to the link L at the time of calculating the cost Cost of the link L. In this case, a relational expression of (addition value)=(weighting coefficient)×(occurrence probability of stopping and going) is satisfied. Accordingly, when the occurrence probability of stopping and going in the section corresponding to the link L increases, the addition value also increases. This is because the driver's burden when the sudden lane change occurs in the same section is considered to increase when the occurrence probability of stopping and going in the section corresponding to the link L is high.

In the above-mentioned embodiments, the cost calculating unit 240 may add an addition value for weighting the predicted value of the occurrence probability of sudden lane change in a link L corresponding to the direct advance in the left lane or the lane change to the left lane in consideration of the street parking frequency at the time of calculating the cost Cost of the link L. In this case, a relational expression of (addition value)=(weighting coefficient)×(street parking frequency of section/personal taste for left lane) is satisfied. Accordingly, the addition value increases when the street parking frequency in the section corresponding to the link L is large, but the increase of the addition value is suppressed when the driver of the guidance target vehicle 100 has particular taste for the left lane. That is, the appropriateness for the section in which the street parking frequency is large is high when the driver of the guidance target vehicle 100 has particular taste for the left lane. Accordingly, the addition value is set in consideration that the driver's burden when the sudden lane change occurs in the same section decreases.

In the above-mentioned embodiments, the cost calculating unit 240 may consider whether a guide rail is present in the section corresponding to a link L corresponding to the direct advance in the left lane or the lane change to the left lane at the time of calculating the cost Cost of the link L. In this case, when a guide rail is present in the section corresponding to the link L, the cost value Cost in the section corresponding to the same link L is set to be smaller than that when the guide rail is not present.

In the above-mentioned embodiments, the cost calculating unit 240 may consider whether a median is present in the section corresponding to a link L corresponding to the direct advance in the right lane or the lane change to the right lane at the time of calculating the cost Cost of the link L. In this case, when a median is present in the section corresponding to the link L, the cost value Cost in the section corresponding to the same link L is set to be smaller than that when the median is not present.

In the above-mentioned embodiments, the cost calculating unit 240 may consider the presence or width of a road shoulder or a roadside zone in the section corresponding to a link L corresponding to the direct advance in the left lane or the lane change to the left lane at the time of calculating the cost Cost of the link L. In this case, when a road shoulder or a roadside zone is present in the section corresponding to the link L, the cost value Cost in the section corresponding to the same link L is set to be smaller than that when the road shoulder or the roadside zone is not present. When the width of a road shoulder or a roadside zone is large in the section corresponding to the link L, the cost value Cost in the section corresponding to the same link L is set to be smaller that when the width of a road shoulder or a roadside zone is small.

In the above-mentioned embodiments, the control center 200 may classify information groups of elements into specific driving characteristic information groups by performing cluster analysis on information of the elements of the driving characteristics of the vehicles 100 stored in the driving characteristic storage unit 223 of the vehicle database 220. In addition, the control center 200 may classify information groups of elements into specific lane characteristic information groups by performing cluster analysis on information of the elements of the lane characteristics in the map information registered in the map information database 212. In this case, at the time of calculating the cost value Cost of the link L, the cost calculating unit 240 sets the second addition value to be added to the predicted value of the occurrence probability of sudden lane change when the appropriateness of the classified driving characteristic information groups and lane characteristic information groups is relatively high to be smaller than that when the appropriateness is relatively low.

In the above-mentioned embodiments, the control center 200 may store information on the steering operation frequency when the vehicle 100 actually runs in the statistics database 230 and may add information for identifying the corresponding point as a specific point to the link information of the map information registered in the map information database 212 on the condition that the average value of the frequencies is greater than a predetermined threshold value.

In the above-mentioned embodiments, the control center 200 may detect whether the steering operation in the vehicle 100 is performed by receiving an image signal of the vehicle 100 imaged with the camera installed in the optical beacon road machine B from the optical beacon road machine B and analyzing the image signal, and may acquire the steering operation frequency in the vehicle 100 in each traffic lane on the basis of the analysis result. On the condition that the frequency is greater than a predetermined threshold value, the control center 200 may add information for identifying the corresponding point as a specific point at which the steering operation in the vehicle 100 is frequently performed to the link information of the map information registered in the map information database 212. In this case, the control center 200 stores information on the steering operation frequency when the vehicle 100 actually runs in the statistics database 230 and adds information for identifying the corresponding point as a specific point to the link information of the map information registered in the map information database 212 on the condition that the average value of the frequencies is greater than a predetermined threshold value.

In the first embodiment, the recommended lane setting unit 241 may exclude a link L in which the cost calculated by the cost calculating unit 240 is greater than a predetermined threshold value in the traveling sections set by the section setting unit 151 and then may search for a traveling route in which the total sum of the costs of the links L calculated by the cost calculating unit 240 is minimized using a Dijkstra's algorithm or the like. In this case, the recommended lane setting unit 241 sets a traffic lane included in the traveling route in which the total sum of the costs is minimized as the recommended lane in the traveling sections set by the section setting unit 151 on the condition that the link L in which the cost Cost is greater than a predetermined threshold value is not included. In this configuration, a route locally including a section in which the sudden lane change of the vehicle 100 often occurs in the route from the current point to the destination point from the appropriate route candidates. That is, since the recommended lane does not locally include a section in which the sudden lane change of the vehicle 100 often occurs, it becomes easy to guide a vehicle 100 to a traffic lane more suitable for suppressing the occurrence of sudden lane change of the vehicle 100.

In the above-mentioned embodiments, the costs in the sections from the current point to the destination point may be calculated by the vehicle 100. For example, first, information of the route from the current point to the destination point is transmitted from the vehicle 100 to the control center 200. Then, the control center 200 transmits information of the costs of all the links L included in the corresponding route to the vehicle 100. Then, the vehicle 100 specifies a recommended lane on the basis of the transmitted information of the costs and generates guidance information for urging the driver to run in the recommended lane.

The invention claimed is:

1. A traffic lane guidance system for a vehicle for guiding a driver of the vehicle to a recommended lane in which the vehicle is recommended to run from among traffic lanes included in a route from a current point of the vehicle as a first point to a destination point of the vehicle as a second point, comprising:
 a vehicle component mounted on the vehicle to output guidance information for the driver; and
 a processor configured to:
 determine a predicted value indicating an occurrence probability of sudden lane change in the traffic lanes;
 determine an addition value, wherein the addition value in the traffic lanes in a direction intersecting a traveling direction of the vehicle is greater than the addition value in the traffic lanes along the traveling direction;
 determining the recommended lane based on the predicted value and the addition value; and
 output guidance information via the vehicle component to the driver according to the recommended lane.

2. The traffic lane guidance system for a vehicle according to claim 1, wherein the vehicle component is a human machine interface.

3. The traffic lane guidance system for a vehicle according to claim 2, wherein the human machine interface is one of a display and a speaker.

4. The traffic lane guidance system for a vehicle according to claim 2, wherein the processor is further configured to include a traffic lane included in the route in which the total sum of the predicted values of the occurrence probability of sudden lane change is minimized by applying a Dijkstra's algorithm to the predicted value of the occurrence probability of sudden lane change determined for each traffic lane included in the route from the first point to the second point.

5. The traffic lane guidance system for a vehicle according to claim 1, wherein the processor is further configured to determine, as the recommended lane, the traffic lane included in the route in which the sudden lane change of the vehicle occurs less in consideration of the entire route from the first point to the second point.

6. The traffic lane guidance system for a vehicle according to claim 1, wherein the processor is further configured to determine a weighting value for the addition value and gradually increases the weighting value determined for the addition value as a distance from a point, at which a steering operation frequency of the vehicle is greater than a predetermined threshold value, decreases in the route from the first point to the second point.

7. The traffic lane guidance system for a vehicle according to claim 1, wherein the processor is further configured to determine a second addition value which is different from a first addition value as the addition value to be added to the predicted values of the occurrence probability of sudden lane change when the addition value is the first addition value and determines the second addition value, when an appropriateness of personal driving characteristics for the traffic lanes is relatively high, to be smaller than that when the appropriateness is relatively low, and
wherein the recommended lane is determined on the basis of the predicted values of the occurrence probability of sudden lane change to which the first addition value and the second addition value are added.

8. The traffic lane guidance system for a vehicle according to claim 7, wherein the processor is further configured to classify information acquired from a plurality of vehicles as information of elements of personal driving characteristics into a plurality of driving characteristic information groups, classify information of elements of lane characteristics into a plurality of lane characteristic information groups, and determine the second addition value to be added to the predicted values of the occurrence probability of sudden lane change, when an appropriateness of the driving characteristic information groups and the lane characteristic information groups is relatively high, to be smaller than that when the appropriateness is relatively low.

9. The traffic lane guidance system for a vehicle according to claim 7, wherein the processor is further configured to determine a third addition value which is different from the first addition value and the second addition value as the addition value to be added to the predicted values of the occurrence probability of sudden lane change and determines the third addition value, when an appropriateness of vehicle characteristics for the traffic lanes is relatively high, to be smaller than that when the appropriateness is relatively low, and
wherein the processor determines the recommended lane on the basis of the predicted values of the occurrence probability of sudden lane change to which the first addition value, the second addition value, and the third addition value are added.

10. The traffic lane guidance system for a vehicle according to claim 1, wherein the traffic lanes include a plurality of positions spaced in the traveling direction of the vehicle in the traffic lanes of a route portion between neighboring points of intersection in the route from the first point to the second point.

11. A traffic lane guidance method for a vehicle of guiding a driver of the vehicle to a recommended lane in which the vehicle is recommended to run from among traffic lanes included in a route from a current point of the vehicle as a first point to a destination point of the vehicle as a second point through the use of a vehicle component mounted on the vehicle to output guidance information for the driver and a processor, the method comprising:
    determining, using the processor, a predicted value indicating an occurrence probability of sudden lane change in the traffic lanes;
    determining an addition value in the traffic lanes, the addition value being greater in a direction intersecting a traveling direction of the vehicle than the addition value in the traffic lanes along the traveling direction;
    determining a recommended lane based on the predicted value and the addition value; and
    outputting guidance information via the vehicle component to the driver according to the recommended lane.

* * * * *